Aug. 15, 1950     C. B. ALBRIGHT     2,518,740
METHOD AND APPARATUS FOR DRYING AND CURING FELTS
Filed Feb. 3, 1947     5 Sheets-Sheet 1

INVENTOR
CHARLES B. ALBRIGHT
BY
Toulmin & Toulmin
ATTORNEYS

Aug. 15, 1950 C. B. ALBRIGHT 2,518,740
METHOD AND APPARATUS FOR DRYING AND CURING FELTS
Filed Feb. 3, 1947 5 Sheets-Sheet 2

FIG. 3

INVENTOR
CHARLES B. ALBRIGHT
BY
Toulmin & Toulmin
ATTORNEYS

Aug. 15, 1950  C. B. ALBRIGHT  2,518,740
METHOD AND APPARATUS FOR DRYING AND CURING FELTS
Filed Feb. 3, 1947  5 Sheets-Sheet 4

INVENTOR
CHARLES B. ALBRIGHT
BY
Toulmin & Toulmin
ATTORNEYS

Aug. 15, 1950     C. B. ALBRIGHT     2,518,740
METHOD AND APPARATUS FOR DRYING AND CURING FELTS
Filed Feb. 3, 1947     5 Sheets-Sheet 5

INVENTOR
CHARLES B. ALBRIGHT
BY
Toulmin & Toulmin
ATTORNEYS

Patented Aug. 15, 1950

2,518,740

UNITED STATES PATENT OFFICE 2,518,740

METHOD AND APPARATUS FOR DRYING AND CURING FELTS

Charles B. Albright, New York, N. Y., assignor to The Orr Felt & Blanket Company, Piqua, Ohio, a corporation of Ohio Application February 3, 1947, Serial No. 726,057

10 Claims. (Cl. 34—24)

This invention relates to a method and apparatus for processing felts, that is, endless belts, that are adapted for use, particularly on paper making machines, but which can be applied to other uses.

In using felts or endless belts upon paper making machines and other types of machines, it is a more or less universal experience that the felts have a relative short life, this being particularly true of felts manufactured from pure wools. The shortness of the life of the felts is due to the various factors that cannot readily be eliminated, such as mechanical wear, or chemical or bacterial action upon the felts.

It has been found, however, that by applying certain resin solutions to the felts upon completion of the manufacture of the body of the felt, and properly curing the resin within the body of the felt, that the life of the felt is greatly increased. To properly dry and cure the resin on and in the felts, it is essential that the excess moisture and volatile materials be eliminated from the body of the felt to obtain a cure of the resin that is carried into the felt in solution. To obtain the proper drying and curing of the felt, has involved a problem because the size of the felts vary greatly, depending upon a particular use to which the felt is to be put, and to the particular machine that is to be used.

Also, to cure the resin in the body of the felt, it is necessary to use elevated temperatures that are sufficiently high to cure the resin, but which will not injure the fibers of the felt, but also, it is essential that the resin be cured uniformly throughout the entire cross-section of the felt, to obtain uniform strength in the felt. The problem is increased by the fact that the wool felts in themselves, are resistant to the passage of heat, being somewhat on the order of thermal insulators so that the fibers in the interior of the felt are somewhat insulated from the heat which would be applied to the surface of the felt. It is therefore, essential that the curing heat be applied uniformly throughout the entire cross-section of the felt.

It has been found that the melamine resins, such as the alkylated-melamine-formaldehyde resins, and others are especially advantageous in prolonging the life of felts. To dry and cure the felts after saturating with a solution of a suitable resin, the body of the felt must be elevated to temperatures at or above 200 degrees F. to properly dry the felt by driving off the volatile material of the resin, and when the felt has suitably dried to a predetermined degree of dryness, the resin will cure at the elevated temperature. According to the nature of the resins that are used, elevated temperatures as much as 400 degrees F. may be required to cure the resins.

To place the resin in the body of the felt, it has been found that a felt can be submerged in a solution of the resin until it is entirely or thoroughly saturated. A portion of the solution may then be centrifuged from the body of the felt until a predetermined quantity of solution remains in the felt. After the felt has passed through the centrifuging process, it may then be dried at elevated temperatures to reduce the moisture content of the felt to a desired value, at which time, the resin retained in the body of the felt, can be cured for permanent retention within the body of the felt.

It is therefore, an object of this invention to provide a method and apparatus for drying and curing a resin within a felt, or endless fabric belt, in a continuous process, and also to carry farther, the process automatically, under full automatic control of the various factors involved in the drying and curing of a felt.

It is another object of this inventtion, to provide a method and apparatus for drying and curing a felt, wherein the body of the felt is maintained at an elevated temperature during the curing and drying operation, and wherein air, at an elevated temperature, is driven through the body of the felt during a part of the time that it is maintained at an elevated temperature for causing uniform drying of the felt and curing of the resin completely through the body of the felt.

It is another object of this invention to provide improved method and apparatus for drying and curing a felt wherein the felt is placed within an atmosphere maintained at an elevated temperature, and the atmosphere is caused to be driven through the body of the felt to uniformly heat the felt throughout its entire thickness, and thereby obtain a uniform drying of the felt and curing of the resin in the felt.

Another object of this invention is to provide an apparatus for drying and curing of felt wherein the felt is placed within a chamber in which the atmosphere is maintained at an elevated temperature and wherein a predetermined volume of fresh, heated air is admitted into the chamber and a like volume of air is discharged from the chamber to remove moisture from the chamber and wherein the air in the chamber is forcefully circulated through the body of the felt to obtain a uniform drying action in the felt and curing of the resin retained therein.

Another object of this invention is to provide an improved roll for supporting a felt in a high temperature atmosphere that is constructed so that the air of the high temperature atmosphere will be drawn throughout the body of the felt, with no substantial by-passing of the air around the body of the felt, regardless as to whether the felt covers the entire roll or not.

Another object of this invention is to provide a method and apparatus for drying and curing of felt wherein a surface movement of the air at elevated temperatures is maintained over the felt to hold the same at an elevated temperature and the air is drawn through the body of the felt forcefully to obtain a uniform heating of the felt throughout its entire thickness.

Another object of this invention is to provide an automatic control system for controlling automatically, the drying and curing operation on the felt.

Another object of this invention is to provide a method and apparatus for drying and curing of felt, and a control system for regulating the apparatus wherein the felt will first be dried to a predetermined degree of dryness and thereafter the resin in the felt may be cured automatically.

Further objects and advantages will become apparent from the drawings and the following description.

Figure 1:
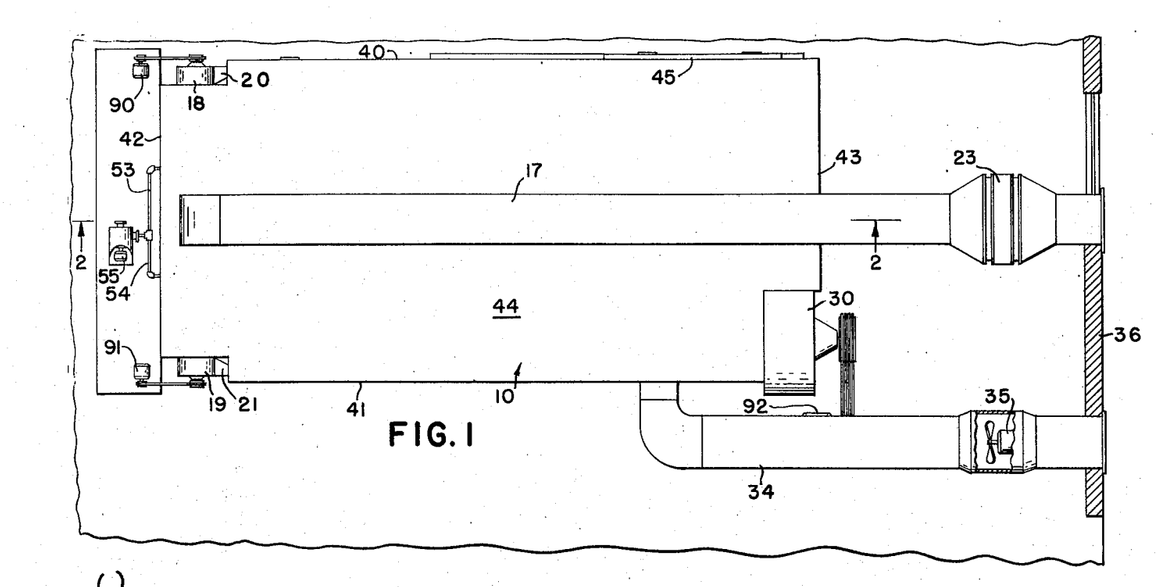
Figure 1 is a plan view of the general arrangement of the apparatus of this invention.
Figure 2:
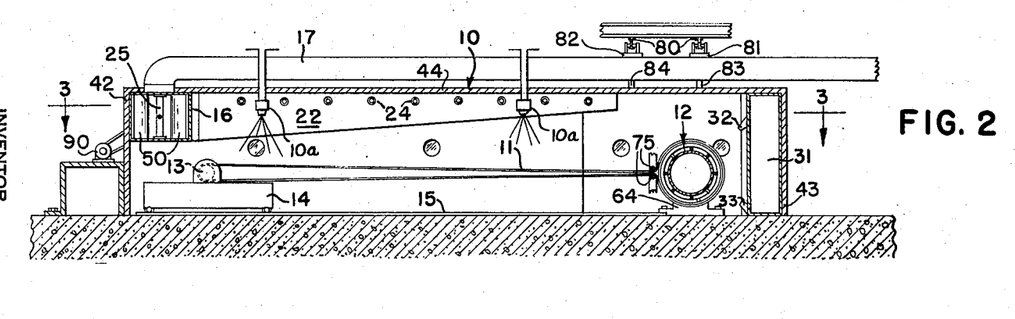
Figure 2 is a vertical cross-sectional view of the apparatus taken substantially along line 2—2 of Figure 1.

The general arrangement of the apparatus of this invention, is illustrated in Figures 1 and 2. The apparatus consists of a drying and curing chamber 10, in which the felt or endless belt 11 is placed for drying and for curing of the resins in the felt. The felt 11 is stretched between a curing drum 12 and a roll 13 that is supported upon a movable carrier 14. During the drying and curing of the felt 11, it is stretched to a predetermined length so that it will have a determined length when the felt is completely dry and the resin cured in the felt. The carrier 14 is supported upon tracks 15 so that the carrier may be moved relative to the curing drum 12, depending upon the length of the felt to be dried and cured.

A fresh air chamber 16 is provided in one end of the curing chamber 10, and has a conduit 17 connected therewith, through which fresh air is drawn by means of blowers 18 and 19, positioned at opposite ends of the chamber 16. The blowers 18 and 19 are connected with their suction side to the chamber 16, the exhaust from the blowers 18 and 19 discharging through the discharge throats 20 and 21 respectively through air ducts 22 that extend longitudinally along the sides of the curing chamber 10.

The fresh air duct 17 is provided with a preheating apparatus 23, which heats the air to a determined value before the air reaches chamber 16.

Figure 4:
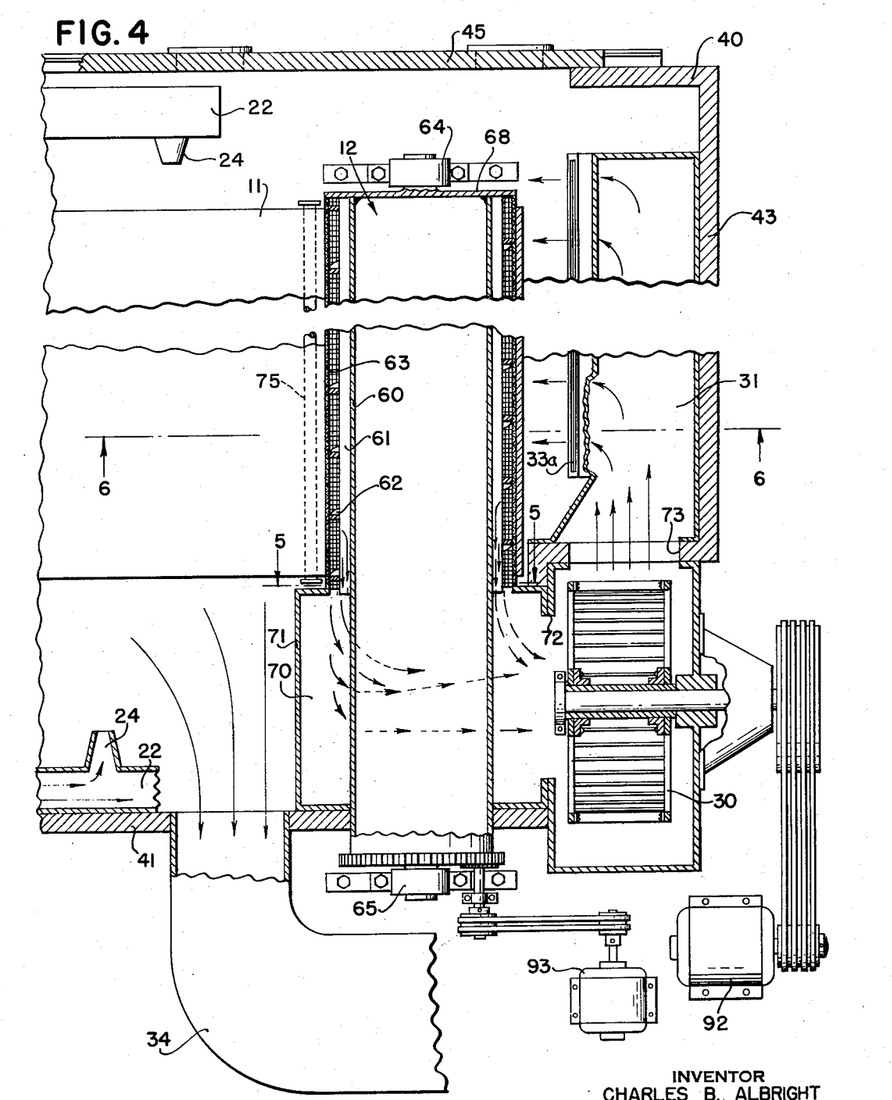
Figure 4 is an enlarged horizontal cross-sectional view of the right-hand end of the apparatus illustrated in Figure 3, and shows same more in detail.

The ducts 22 are provided with outlet orifices or jets 24, as illustrated in Figures 2 and 4, through which the air is discharged into the curing chamber 10 from the ducts 22.

The chamber 16 is provided with heating units 25 for heating the air drawn through the chamber 16 by blowers 19 and 20, which heated air is discharged into the curing chamber 10 through orifices 24.

A blower 30 has the suction side thereof, connected with the interior of the curing chamber 10, in a manner hereinafter described, for receiving air from the curing chamber and for discharging the air received from the curing chamber into a plenum chamber 31, positioned adjacent to the curing drum 12. The plenum chamber 31 is provided with a nozzle 32 for directing a stream of air downwardly upon drum 12 and with a similar nozzle 33 for directing a stream of air upwardly upon the drum 12. The nozzles 32 and 33 have slots 32a and 33a through which the air discharges.

An exhaust conduit 34 is connected with the interior of curing chamber 10, and is provided with a blower or fan unit 35 therein, for aiding the exhaust of air from the curing chamber 10 under certain conditions hereinafter described.

The fresh air conduit 17 and the exhaust conduit 34 are connected to the outside of the building 36, so that air may be received from the outside of the building and discharged to the outside of the building.

The curing chamber 10 is composed of side walls 40 and 41, end walls 42 and 43, and top wall 4. The curing drum 12 is placed at one end of the curing chamber 10, and an access door 45 is positioned along the side wall 40 to provide access to the drum 12 to load and unload a felt upon the drum and into the curing chamber.

Figure 3:
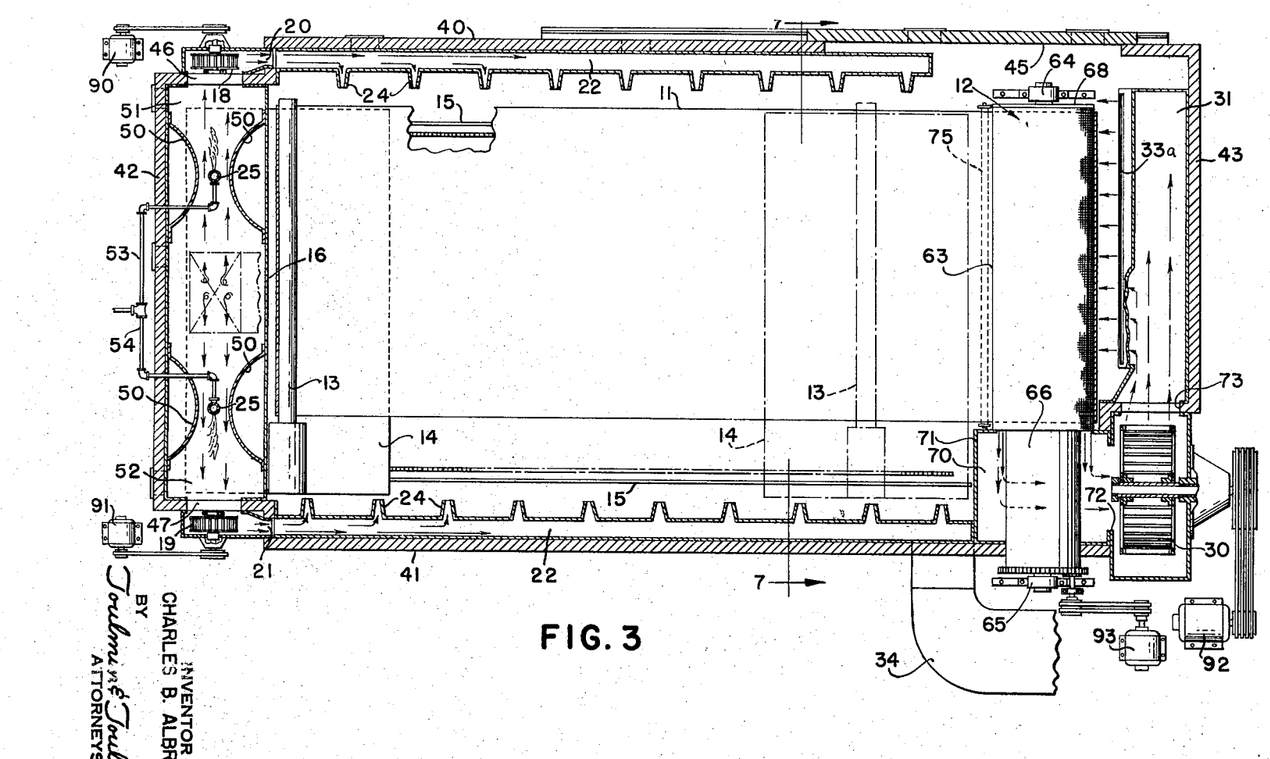
Figure 3 is an enlarged horizontal cross-sectional view of the apparatus taken substantially along line 3—3 in Figure 2.

The fresh air duct 17 connecting with the chamber 16, shown at the left end of the curing chamber 10 in Figure 3, delivers the fresh air into the chamber 16, after passing through the preheater 23, substantially centrally of the chamber 16. The blowers 18 and 19 are positioned adjacent opposite end walls of the chamber 16, receiving air from the chamber through the suction openings 46 and 47 respectively. The blowers 18 and 19 discharge air received from the chamber 16 through ducts 22. As illustrated in Figure 2, the ducts 22 decrease in area as they extend from the blowers 18 and 19 to provide for uniform discharge of air through the several openings or nozzles 24 provided along the ducts 22.

The heating units 25, which in this apparatus consist of gas burners, are positioned at opposite ends of the chamber 16, and direct the gas flames from the burners 25 toward the respective blowers 18 and 19. The gas burners extend substantially from the top to the bottom of the chamber 16, as illustrated in Figure 2. At each side of the heating units or burners 25, there is positioned the baffle plates 50 which causes the air drawn into the chamber 16 by the blowers 18 and 19, to pass closely adjacent the burners 25 and thereby intimately mix with the flames and products of combustion emitted from the burners 25. It will be noted that chambers 51 and 52 adjacent the inlet openings 46 and 47 for the blowers 18 and 19 are relatively large, having increased in area from the size of the chamber between baffles 50 to thereby provide a mixing chamber for the gas and air so that the temperature of the gases entering the blowers 18 and 19 will be substantially below the temperature of the gas flames emitted from the burners 25. In the apparatus of this invention, the temperature after entering the blowers 18 and 19 is about 850° F. The gas is delivered to the burners 25 through the pipes 53 and 54 from a gas booster 55, see Figure 8.

Figure 5:
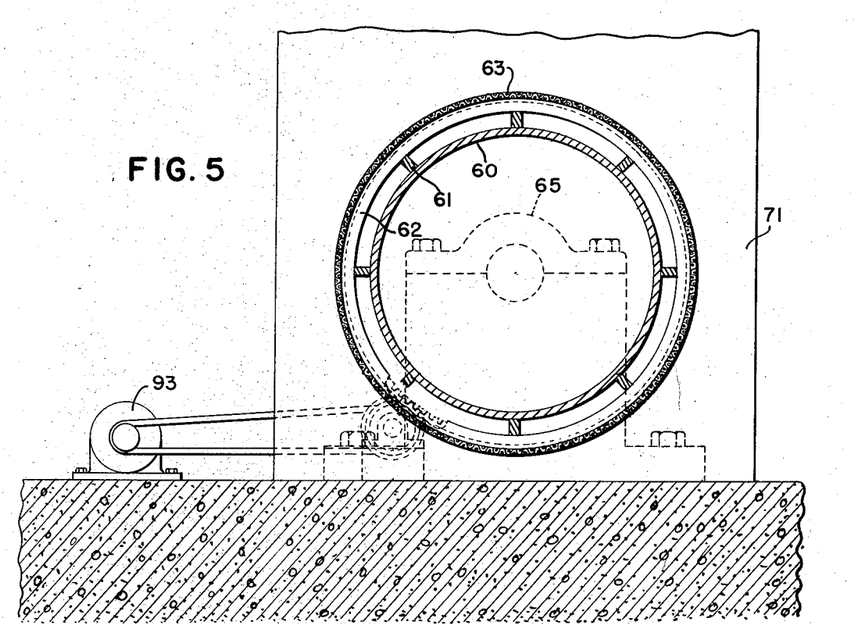
Figure 5 is an enlarged cross-sectional view of the curing drum that is taken substantially along line 5—5 of Figure 4.
Figure 6:
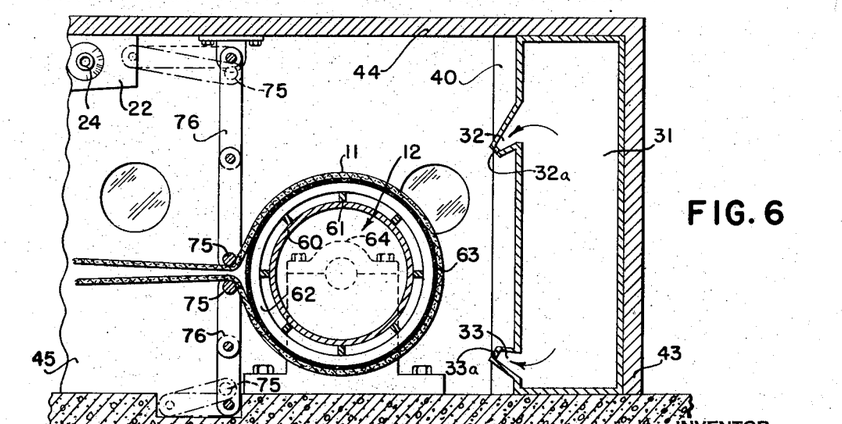
Figure 6 is a vertical cross-sectional view of the apparatus taken substantially along line 6—6 of Figure 4.

The curing drum 12 is more specifically shown in Figures 4, 5 and 6. The drum 12 consists of a cylindrical shell that has a plurality of radially disposed fins 61 extending from the outer surface of cylinder 60. A spirally-shaped fin 62 is disposed upon the radially disposed fins 61. A foraminous cylinder 63 is disposed upon the spiral fin 62 and which provides a gas chamber between the foraminous cylinder 63 and the solid cylinder 60. The foraminous cylinder 63 is preferably constructed from wire mesh screen, and is adapted to present approximately three times the resistance to the passage of air through the screen as compared to the resistance of the heaviest and densest felt that will be processed on the curing drum 12. Thus, the resistance of the felt, when it is placed upon the foraminous cylinder 63, will not affect the total resistance through the screen and the felt sufficiently as to cause substantial quantities of the air to by-pass the felt through the portions of the cylinder 63 that are not covered with the felt 11.

The cylinder 60 is carried upon a pair of bearing structures 64 and 65 which may be ordinary sleeve bearings.

One end of the cylinder 60 carries a solid plate 66 which extends to the periphery of the foraminous cylinder 63, to thereby close one end of the chamber between the cylinder 63 and the cylinder 60. The opposite end of the chamber between cylinders 63 and 60 communicates with a chamber 70 formed by the chamber walls 71. This chamber 70 is connected with the inlet opening 72 of the fan unit or blower 30. The blower 30 discharges air received from the chamber 70 into the plenum chamber 31 through the discharge opening 73. It will thus be seen that all the air received on the suction side of the blower 30, must be obtained from chamber 70, which in turn, receives all its air from the chamber between the foraminous cylinder 63 and the solid cylinder 60. Thus, the air received into the chamber between cylinders 60 and 63, must be drawn through the felt 11, that is disposed upon the surface of the foraminous cylinder 63, and for the reason heretofore mentioned, the air will not substantially by-pass the felt 11, should the felt be of less width than the length of the cylinder 63.

To cause the felt 11 to substantially encircle the foraminous cylinder 63, idler rolls 75, see Figure 6, are positioned adjacent the outer surface of cylinder 63, and are disposed closely adjacent one another so that the felt 11, substantially and completely encircles cylinder 63. That is, idler rolls are carried upon suitable articulated lever systems 76 to provide for positioning the rolls 75 in the position illustrated in Figure 6, or to place them in the dotted line position to allow for removal of the felt 11 from the curing drum 12.

The plenum chamber 31 is provided with a nozzle 32, heretofore mentioned, which directs a stream of air downwardly upon the surface of the felt 11, as it passes around the curing drum 12. A similar nozzle 33 directs air from the plenum chamber 31 upwardly upon the surface of the felt 11. The forceful application of the streams of heated air upon the surface of the felt 11, together with the suction of the blower 30 producing a low pressure area within the chamber between the cylinders 60 and 63, causes a large volume of heated air to be constantly delivered through the body of the felt on the curing drum 12, and thereby, uniformly heats the felt through its entire thickness and obtains a constantly acting drying effect and a uniform curing of the resin in the body of the felt after the felt has reached a predetermined degree of dryness.

Figure 7:
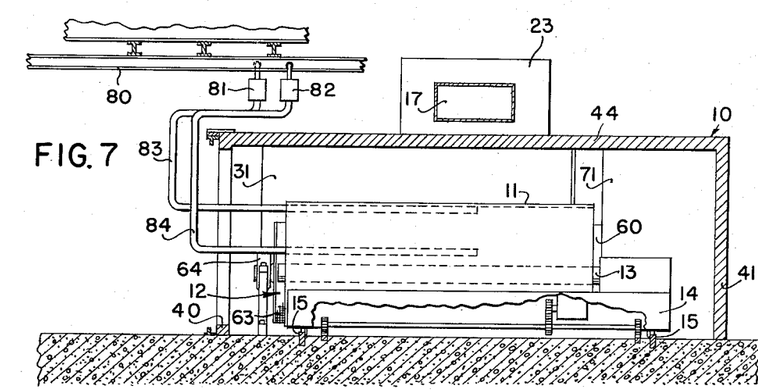
Figure 7 is a vertical cross-sectional view of the apparatus taken substantially along line 7—7 of Figure 3, illustrating the manner of loading a felt into the apparatus.

In Figures 2 and 7, there is illustrated an overhead trolley system that is adapted for loading and unloading a felt into and out of the curing chamber 10. The trolley system consists of a pair of rails 80 that independently carry the trolleys 81 and 82. Each of the trolleys 81 and 82 have a U-shaped carrier bar 83 having a long leg 84, upon which the felt is carried when either placing it into the chamber 10, or removing it therefrom.

The blowers or fan units 18 and 19 are driven by electric motors 90 and 91 respectively. The blower 30 is driven by an electric motor 92, and the curing drum 12 is driven by an electric motor 93. The electric motors are connected with their respective driven units by means of conventional belt systems.

*General operation*

In operation, a felt or endless fabric belt, is first processed with a solution of the resin that is to be cured upon the felt. Resin impregnation of the felt may be obtained in any desired manner, since this invention is directed particularly to the drying of the felt and to the curing of the resin in the felt.

The processed wet felt is placed upon the arms 84 of the trolley system shown in Figure 7, and is carried thereby into the curing chamber 10 and is placed upon the curing drum 12 and the stretching roll 13. The bearing member 64 is removed from the end of the drum 12 at this time and the drum is supported by a suitable jack beneath the drum while the felt is being placed on the drum. The carriage 14 may then be moved away from the drum 12 while simultaneously drying the drum 12, to stretch the felt 11 to the desired length as determined by the previous manufacturing operations. During this period of placing the felt within the curing chamber 10, the air circulating and heating systems are of course inactive.

The fans on the blower units 18 and 19 are then started in operation, and the fan unit 35 is also started in operation, so as to obtain a rapid circulation of outside air through the curing chamber 10, and thereby purge the curing chamber of any gases that may have accumulated after the access door 45 is closed. Of course during this period, the heater units 25 are inactive.

After a predetermined period of purging, the fan unit 35 is stopped and gas is then supplied to the heating units 25 for heating the air being drawn into the chamber 10 by the continued operation of the blowers or fan units 18 and 19. At this time the preheater unit 23 becomes operative. In the apparatus of this invention, the fan units 18 and 19, together, draw in approximately 5,000 c. f. m. The heating units are controlled automatically to regulate the temperature of the air within the curing chamber 10 in a manner hereinafter described, and any elevated temperature desired, may be maintained within the curing chamber 10, depending upon the resin to be cured and the materials in the felt.

The curing drum 12 is rotated by the electric motor 93, it having also been started previously during the stretching of the felt, so that the air drawn into the suction side of the fan 30, which has now been started, through the felt on the periphery of the foraminous cylinder 63, will be discharged into the plenum chamber 31, for impingment upon the surface of the felt to drive moisture or volatile matter from the felt. The blowers 18 and 19 are concurrently discharging the heated air received from chamber 16 into the ducts 22, and the air is being delivered into the curing chamber 10 through the openings or jets 24. The heated air within the curing chamber 10, circulates around the felt 11 in a highly agitated condition, thereby driving moisture from the felt 11, as it extends between the curing drum 12 and the stretching roll 13. The air circulated by the fan 30, also discharges into the interior of the curing chamber 10, since the fan 30 provides for a constant re-circulation of air within the curing chamber 10, thereby adding its services to the elimination of moisture or volatile material from the felt 11.

Since the fans 18 and 19 constantly draw in a predetermined quantity of fresh air through conduit 17, that is preheated by the preheater 23, a constant discharge of air will be had through discharge conduit 34. Thus, as the moisture is eliminated from the felt 11, it will be conducted out of the discharge conduit 34.

As the drying operation of the felt proceeds, the moisture content of the felt gradually drops until it is four or five percent of the dry weight of the felt, at which time, it has been determined that curing of the resin begins. The movement of the felt within the curing chamber 10 by the curing drum 12, is continued for a predetermined period of time sufficient to cause a complete cure of the resin through the entire body of the felt. During the curing period for the resin, the heat within the curing chamber 10, maintains the body of the felt between the curing drum 12 and the stretching roll 13, at substantially curing temperatures. However, a uniform cure of the resin into the body of the felt is obtained as the felt passes over the curing drum 12, due to the forceful movement of heated air through the body of the felt as caused by the fan 30, which in this apparatus, handles approximately 20,000 c. f. m.

After the heat has been applied to the felt for a sufficient period of time to cause a cure of the resin within the felt, the preheating unit 23 and the heating units 25 are rendered inactive, and the fan unit 35 is again rendered active to increase the volume of air drawn through the curing chamber 10, and thereby rapidly purge the heat within the curing chamber 10. In the apparatus of this invention, fan unit 35 is capable of handling approximately 10,000 c. f. m.

Upon completion of the purging of the curing chamber 10 of heated air, the fan unit 35 may be again stopped, and humidification be supplied to the curing chamber 10 through water spray nozzles 16a to return the felt to its normal moisture content, which averages approximately 12% of the dry weight of the felt. All of the fan units are then rendered inactive, and the access door 45 can be opened to permit removal of the felt 11, with the aid of the trolley system referred to previously.

Figure 8:
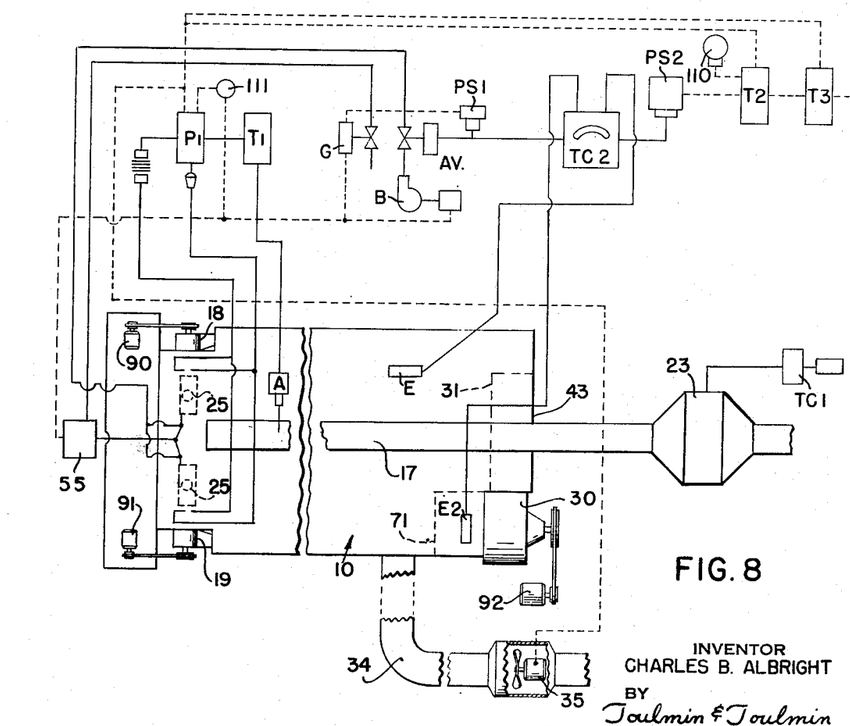
Figure 8 is a diagrammatic illustration of a control system for controlling the several operations of the apparatus automatically throughout the drying and curing cycles.

A control system for automatically controlling the complete cycle of operation of the apparatus herein before described, is diagrammatically illustrated in Figure 8. The instrument controls referred to herein, are of a type known as "air-actuated" controls, and specifically, the individual controls are manufactured by the Minneapolis Honeywell Regulator Company, Brown Instruments Division, and are standard controls of this company. Therefore, the functioning of the various controls will be described with reference to the automatic control of the apparatus described herein, without reference to the details of the mechanism of the controls, since the mechanisms of the controls are not a part of the subject matter of this invention, but the particular functions which they produce in controlling the apparatus of this invention, do constitute a part of the method of control of this apparatus for performing the method of drying and curing of felts or endless fabric belts in accordance with this invention.

The controls referred to are a combination of air-actuated units and electric units that are operated in response to the operation of the air-actuated units. Hence, there is provided a main electrical controller for energizing the power circuit for the instruments. Also, an electrical controller or controllers are provided for energizing the electric motors which drive the various air circulating fans and the curing drum 12. The electric motors 90, 91, 92 and 93 may all be started simultaneously by a single control or under the regulation of independent controllers. However, the electric motor which drives fan unit 35, is under separate control for reasons which will be hereinafter described.

The controls for the apparatus consist of an air flow switch "A", responsive to the blowers 18 and 19, the purpose of this switch being to insure the operation of the air circulating system before further controls are placed in operation. Operation of the air flow switch "A", indicating that blowers 18 and 19 are in operation, effects action of a purging timer $T_1$ which controls the period of time that the exhaust fan 35 will operate prior to the beginning of the heating cycle to purge the curing chamber. The timer $T_1$ operates through a flame electrode protective device $P_1$. When the purging timer $T_1$ times out, it affects operation of the flame electrode protective device $P_1$ for igniting the gas heating units 25. The flame electrode device $P_1$ insures ignition of the burners before action of any subsequent controls.

The preheater 23 may be under control of an outdoor temperature controller $TC_1$ to regulate the temperature of the air admitted into chamber 16. The curing timer $T_2$ indicates the starting and regulates the ending of the curing cycle and the cooling timer $T_3$ regulates the period of purging of the drying and curing chamber 10 upon completion of the curing cycle.

The gas burners 25 receive their gas supply under control of the gas valve G which is under control of the flame electrode protective device $P_1$ so that if the protective device $P_1$ is satisfied, the gas valve G will open and remain open, otherwise it will close. The gas supplied through the valve G may additionally be aided by the gas booster 55 for delivering the large volume of gas required to the burners 25.

The air supply for the gas burners 25, is supplied by the blower B under control of the air supply valve AV, which is regulated by the temperature controller $TC_2$ that has one thermal element E thereof responsive to the temperature of the air supplied into the curing chamber 10 for automatically controlling the temperature of the heated air by regulating the quantity of air supplied with the gas to the burners 25. A pressure switch PS1 is also provided for controlling the gas valve G, and is responsive to the pressure of the air delivered into the valve AV, so that when the air delivered through the valve AV is at or below one-half the capacity of the valve, the pressure switch will close the gas valve G. This is a safety feature in that the gas burners will not perform satisfactorily except when air of a predetermined volume is delivered with the gas.

The temperature controller TC2 is provided with a second thermal element E2 that is responsive to the temperature of the air in the chamber 70, so that a second element of the temperature controller TC2 is actuated when the temperature of the element E2 is a few degrees below the temperature of element E. As the temperature of element E2 approaches the temperature of element E, the dryness of the felt is indicated, and the curing cycle is ready to start. The pressure switch PS2 will then bring influence to bear and the temperature controller TC2 will energize the timer T2 to indicate the start of the timing of a curing cycle by ringing a buzzer 110 to indicate that the curing cycle is started.

When the curing timer T2 times out, the main gas valve G closes, while the blowers 18 and 19 continue in operation and the fan unit 35 is started. Concurrently, the purging or cooling timer T3 is energized for regulating the cooling cycle to purge the heat from the curing chamber. When the cooling timer T3 times out, the control system may be de-energized and the drying and curing chamber 10 opened and the cured felt removed therefrom.

A signal light 111 is provided for indicating when the flame electrode device is functioning to indicate whether the burners 25 are ignited, the signal light being adapted to be turned on when the burners fail to ignite.

While the apparatus disclosed and described herein and the method performed by the apparatus constitutes a preferred form of the invention, yet it will be understood that the apparatus is capable of mechanical alteration, and the method of performance by the apparatus is capable of modification without departing from the spirit of the invention, and that all modifications that fall within the scope of the appended claims, are intended to be included herein.

Having thus fully described my invention, what I claim as new and desire to secure by Letters Patent is:

1. A drying and curing apparatus for drying a closed loop fabric belt and curing a resin therein including, a heating chamber, means supplying a controlled volume of heated air into said chamber, roll means in said chamber spaced from one another, means mounting one of said rolls for translation toward and away from the other to stretch the fabric belt between the rolls, one of said roll means comprising a foraminous roll, air circulating means causing circulation of air from within said chamber through said foraminous roll, means exhausting a controlled volume of air from said chamber equal to that supplied and including additional means for temporarily increasing the volume of air exhausted from said chamber above the said controlled volume.

2. A method of drying an endless papermakers fabric belt forming a closed loop and curing a heat curable resin contained therein that includes, stretching an endless fabric belt between a pair of rolls within a heating chamber, continuously recirculating heated air within the chamber and around the belt and rolls in one path to raise the temperature of the belt to that at which the resin is curable, and concurrently causing air heated to a temperature at which the resin is curable to circulate in a second path transversely through one limited portion of the body of the fabric belt to uniformly heat that limited portion throughout the thickness thereof.

3. A method of drying an endless papermakers fabric belt forming a closed loop and curing a heat curable resin contained therein that includes, stretching an endless fabric belt between a pair of rolls within a heating chamber, continuously recirculating heated air within the chamber and around the belt and rolls to raise the temperature of the belt to that at which the resin is curable, and concurrently drawing a portion of the heated air from the chamber transversely through one limited portion of the fabric belt and recirculating the same in a second path including impingement of the said air upon the said limited portion to obtain uniform heating of that limited portion throughout the entire thickness thereof.

4. A method of drying an endless papermakers fabric belt forming a closed loop and curing a resin contained therein that includes, stretching an endless fabric belt between a pair of rolls within a heating chamber, continuously recirculating heated air within the chamber and around the belt and rolls in one path to raise the temperature of the belt to that at which the resin is curable and concurrently drawing a portion of the heated air from the chamber transversely through one limited portion of the fabric belt and returning the air withdrawn from within said chamber to said chamber without treatment in a second path in high velocity streams upon that portion of the fabric belt through which air is being drawn to obtain uniform heating of that limited portion throughout the entire thickness thereof.

5. A method of drying an endless woven papermakers fabric belt forming a closed loop and curing a heat curable resin contained therein that includes, stretching an endless fabric belt between a pair of rolls within a heating chamber, continuously recirculating heated air within the chamber in one path around the belt and rolls to raise the temperature of the belt to that at which the resin is curable, concurrently drawing heated air from the chamber transversely through one limited portion of the fabric belt and returning the air withdrawn from within said chamber to said chamber in a second path in high velocity streams impinged upon that portion of the fabric belt through which air is being drawn to obtain uniform heating of that limited portion throughout the entire thickness thereof, and continuously moving the belt in the chamber between the rolls and past the station at which the air is drawn transversely through the belt to sequentially cause all portions of the belt to have air forcefully passed therethrough at regular intervals until the belt is dry and the resin contained therein is cured.

6. A method of drying an endless woven papermakers fabric belt forming a closed loop and curing a heat curable resin contained therein that includes, stretching an endless fabric belt between a pair of rolls within a heating chamber, continuously recirculating heated air within the chamber in one path around the belt and rolls to raise the temperature of the belt to that at which the resin is curable, concurrently drawing heated air from the chamber transversely through one limited portion of the fabric belt and returning the air withdrawn from within said chamber to said chamber in a second path in high velocity streams impinged upon that portion of the fabric belt through which air is being drawn to obtain uniform heating of that limited portion throughout the entire thickness thereof, continuously moving the belt in the chamber between the rolls and past the station at which the air is drawn transversely through the belt to sequentially cause all portions of the belt to have air forcefully passed therethrough at regular intervals until the belt is dry and the resin contained therein is cured, and continuously exhausting a quantity of air from said chamber and introducing a like quantity of fresh heated air thereto for eliminating moisture from the said chamber.

7. Apparatus for drying a woven porous endless fabric belt and curing a resin contained therein including, a heating chamber, a foraminous roll positioned in said chamber at one end thereof for supporting an endless fabric belt, a second roll positioned in said chamber at the opposite end thereof and movable relative to said first roll whereby to stretch a fabric belt between the said rolls within said chamber, air circulating means forming a closed circuit with said chamber conducting heated air into the said chamber and recirculating the same for circulation generally within said chamber around said rolls and a fabric belt extending therebetween, and a second air circulating means having the inlet side thereof connected with the interior of said foraminous roll for drawing heated air from said chamber through said foraminous roll and a fabric belt carried thereon and including in the discharge side thereof means forming gas streams directing the heated air drawn through said foraminous roll upon the surface of the said roll and a fabric belt carried thereon.

8. Apparatus for drying a woven porous endless fabric belt and curing a resin contained therein including, a heating chamber, a foraminous roll positioned in said chamber at one end thereof for supporting an endless fabric belt, a second roll positioned in said chamber at the opposite end thereof and movable relative to said first roll whereby to stretch a fabric belt between the said rolls within said chamber, air duct means extending longitudinally of said chamber having outlet means for directing air transversely of said chamber, air circulating means connected with said duct means for conducting heated air into the said duct means and thereby into said chamber for circulation generally within said chamber around said rolls and a fabric belt extending therebetween, and a second air circulating means connected with the interior of said foraminous roll for drawing heated air from said chamber through said foraminous roll and a fabric belt carried thereon, said second air circulating means including means for directing the heated air drawn through said foraminous roll upon the surface of the said roll and a fabric belt carried thereon.

9. Apparatus for drying a woven porous endless fabric belt and curing a resin contained therein including, a heating chamber, a foraminous roll positioned in said chamber at one end thereof for supporting an endless fabric belt, a second roll positioned in said chamber at the opposite end thereof and movable relative to said first roll whereby to stretch a fabric belt between the said rolls within said chamber, air duct means for supplying fresh air to said chamber, air heating means in said fresh air duct means for heating the air before introduction into said chamber, air duct means extending longitudinally within said chamber for directing air transversely thereof, air circulating means connecting said fresh air duct means and said duct means in said chamber whereby to conduct the heated fresh air from said fresh air duct means into said duct means in said chamber for distribution within said chamber, air circulating means for exhausting heated air from said chamber, and an air circulating means connected with the interior of said foraminous roll for continuously re-circulating heated air from said chamber from the interior of said foraminous roll onto the surface thereof.

10. Apparatus for drying a woven porous endless fabric belt and curing a resin contained therein including, a heating chamber, a foraminous roll positioned in said chamber at one end thereof for supporting an endless fabric belt, a second roll positioned in said chamber at the opposite end thereof and movable relative to said first roll whereby to stretch a fabric belt between the said rolls within said chamber, fresh air duct means for conducting fresh air to said chamber, air heating means in said fresh air duct means for heating the fresh air passing therethrough, air duct means extending longitudinally of said chamber for directing air transversely of said chamber for general circulation within the chamber, air circulating means for directing air from said fresh air duct means into said duct means in said chamber, an air circulating means connected with the interior of said foraminous roll for continuously recirculating heated air from said chamber from within said foraminous roll to upon the surface of the said roll, and exhaust air circulating means connected with said chamber adjacent said foraminous roll to remove exhaust air from said chamber adjacent the foraminous roll.

CHARLES B. ALBRIGHT.

REFERENCES CITED

The following references are of record in the file of this patent:

UNITED STATES PATENTS

| Number | Name | Date |
|---|---|---|
| 920,351 | Layland et al. | May 4, 1909 |
| 1,552,099 | Walsh | Sept. 1, 1925 |
| 1,601,332 | Whitehead et al. | Sept. 28, 1926 |
| 2,065,636 | Whipple et al. | Dec. 29, 1936 |
| 2,119,261 | Andrews | May 31, 1938 |
| 2,194,713 | Mitchell | Mar. 26, 1940 |
| 2,252,181 | Hunter et al. | Aug. 12, 1941 |
| 2,301,249 | Butterworth Jr. et al. | Nov. 10, 1942 |
| 2,324,519 | Krueger et al. | July 20, 1943 |
| 2,325,204 | Kilborn | July 27, 1943 |
| 2,416,027 | Shields | Feb. 18, 1947 |
| 2,436,028 | Wiegerink | Feb. 17, 1948 |

FOREIGN PATENTS

| Number | Country | Date |
|---|---|---|
| 383,447 | Great Britain | Nov. 17, 1932 |
| 393,417 | Great Britain | June 8, 1933 |